June 1, 1965　　　D. C. FREEMAN, JR　　　3,186,875
SOLID STATE BATTERY
Filed Sept. 15, 1959　　　3 Sheets-Sheet 1

INVENTOR.
DONALD C. FREEMAN, JR.
BY
ATTORNEY

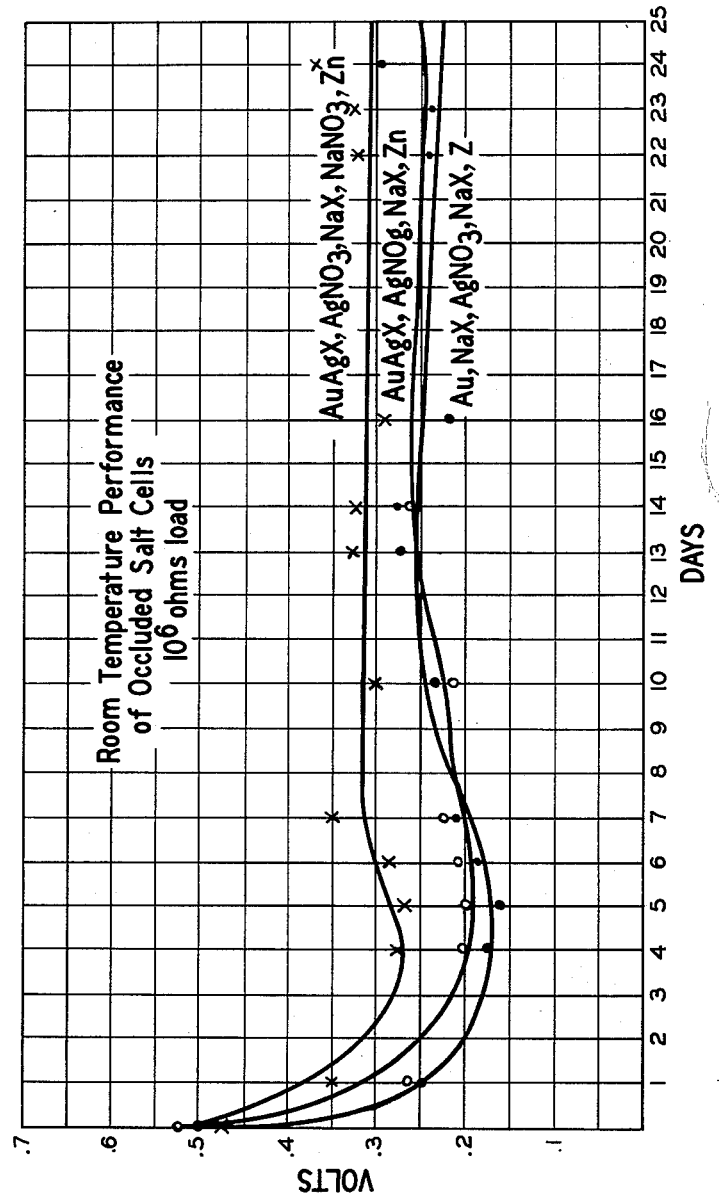

3,186,875
SOLID STATE BATTERY
Donald C. Freeman, Jr., Durham, N.C., assignor to Union
Carbide Corporation, a corporation of New York
Filed Sept. 15, 1959, Ser. No. 840,116
18 Claims. (Cl. 136—153)

This invention relates to an improved solid state battery. More particularly, it relates to a solid state battery utilizing ion exchanged crystalline zeolites.

Batteries of the solid electrolyte type are particularly useful as power sources for electronic components requiring low currents for their operation such as transistors and certain types of meters. In many of such low-current applications light weight, compactness and ability to operate over extremely wide temperature ranges are requisites of the power source. However, solid batteries presently available have operating temperature limits generally from about —60° to 150° C.

As stated above, for many applications the ability of a power source to remain operational at elevated temperatures is of primary importance. Instrumentation equipment used in misiles requires batteries that must be able to operate reliably at temperatures in excess of several hundred degrees centigrade. Developing batteries which would operate at these temperatures without complicated cooling or insulation systems and at the same time be compact and light weight has been a problem long confronting the industry.

It is accordingly an object of this invention to provide a battery which is compact, light weight, has a long shelf life and is extremely durable.

It is a further object to provide such a battery which will operate reliably at elevated temperatures.

It is a still further object to provide such a battery utilizing crystalline zeolite materials.

Other objects and advantages will be apparent from the description and drawings in which:

FIGS. 2 through 6 are graphs illustrating the performance characteristics of different battery cells according to the invention.

According to this invention there is provided a solid state battery which comprises a first layer of a conductive material, a second layer in intimate contact therewith of a crystalline zeolite ion-exchanged with an easily reducible metal cation, a third layer in intimate contact with said second layer of a crystalline zeolite material which is a good ionic conductor, and a final layer in intimate contact with said third layer of a metal that is more electropositive than said reducible metal cation.

In the course of studies on the electrical properties of crystalline zeolites it has been found that many of these zeolites are good ionic conductors and require a relatively small activation energy for conduction. The conductivity of some zeolites has been found to be particularly high in the hydrated state, but even in an anhydrous state the conductivities are of the order of 10,000 times that of typical ionic crystals at room temperature. It is due to this fact that a battery utilizing such materials is feasible.

The basic operation of a galvanic cell may be described by the typical reaction

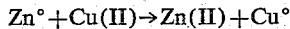

$$Zn° + Cu(II) \rightarrow Zn(II) + Cu°$$

In a preferred embodiment of a solid-state battery of the present invention the Cu(II) is contained in the form of a copper-ion-exchanged sodium zeolite X denoted by Cu(II)X. The ion-exchanged zeolite containing copper, silver, mercury or other suitable metal or metals as cations is referred to herein as the "catholyte," rather than as a "cathode," since in the solid-state cell of the invention there is not a well-defined separation of cathode and electrolyte. As used in the present discussion the term "solid-state" applies to cells where the zeolite is hydrated to various degrees as well as to cells operating under conditions where the zeolite may be substantially dehydrated.

Figure 2:
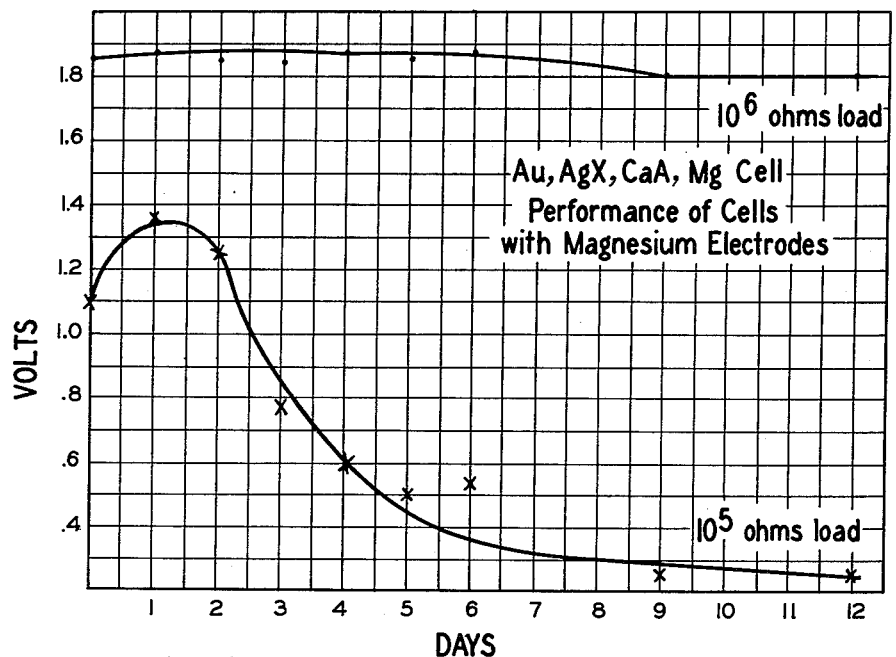
Figure 1:
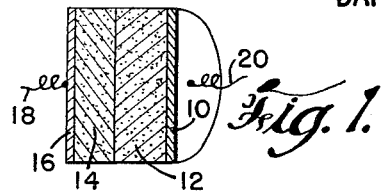
FIG. 1 is a cross sectional view of a solid state battery according to the invention.
Figure 3:
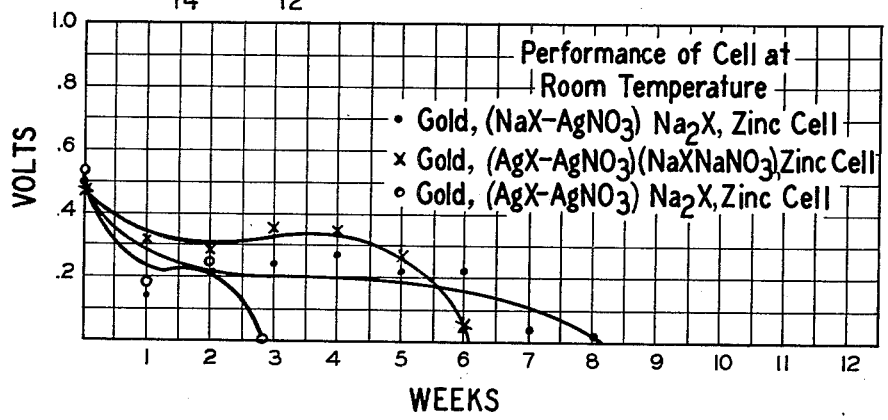
Figure 4:
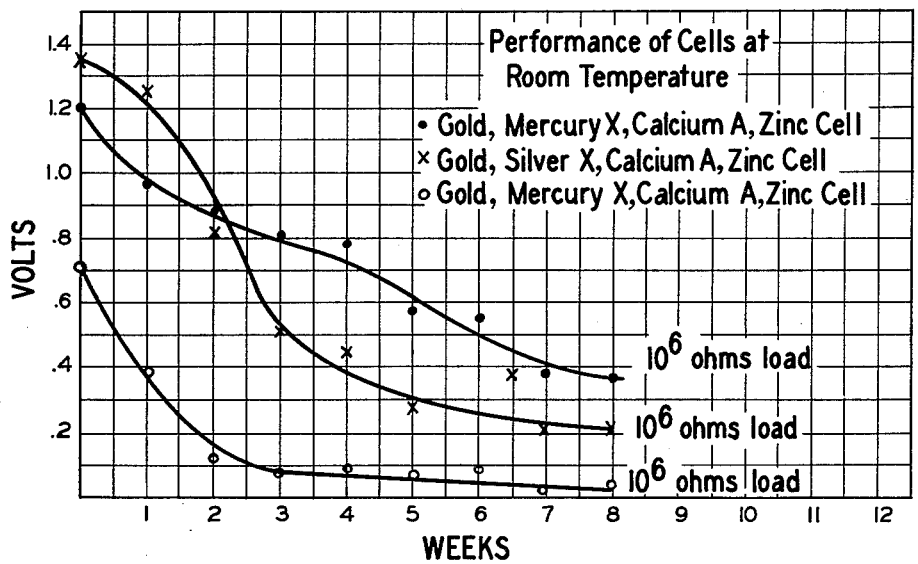
Figure 5:
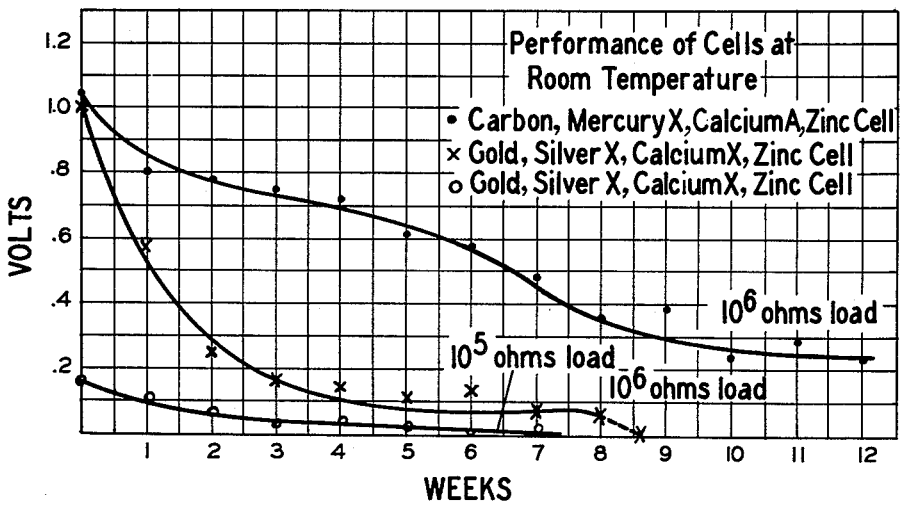

FIG. 1 illustrates a solid state battery according to the invention. An anode 10 is formed of a disk of a metal suitable for the galvanic cell reaction, numeral 12 denotes a layer of crystalline zeolite separator, 14 is a metal ion-exchanged crystalline zeolite catholyte and metal disk 16 serves to make electrical contact with the catholytic material and will be referred to hereinafter as the catholyte-contact. Conductors 18 and 20 are affixed as by soldering to catholyte-contact and anode disks 16 and 10.

The term zeolite cell as used hereinafter is intended to mean a cell having a reducible metal ion-exchanged crystalline zeolite material as the catholyte and a crystalline zeolite as the separator.

Zeolite primary cells appear to operate in a fairly conventional manner, as set forth above, except that a continuous phase of water is not required as a medium for electrolytic charge transfer. Metal atoms are oxidized at the anode with the liberation of electrons. Concomitantly, the catholyte ions, for example copper ions, are reduced to metal atoms. A possible mechanism for the necessary ionic charge transfer within the cell is the diffusion of a cation vacancy from the position vacated by the reduced catholyte ion through the zeolite lattice to the point where it can be filled by a metal ion, for example zinc liberated from the anode.

There are two reasons for assuming that a continuous phase of liquid water is not present between the electrodes of the cell which is to say that the interstices between the zeolite crystallites are not filled with water. First, it is known from many measurements that in an environment of 75% relative humidity, the affinity of zeolite for water is such that all of the water will be in the interior of the crystals. This is corroborated by the fact that the addition of water to a zeolite cell will only slightly enhance its performance (by lowering internal resistance) until that point is reached at which the zeolite crystals are saturated. Beyond this point the power output increases tremendously and in a manner indicative of a cell composed of a conventional aqueous electrolyte. Secondly, the cells have been found to operate when packed in Dry Ice, thus at a temperature not greater than —70° C. If the cell were dependent upon a continuous phase of liquid water for operation that phase would certainly have ceased to exist at this temperature and cell operation would have ceased. Similarly, the operation of a cell at 500° C. could hardly be dependent upon continuous liquid aqueous electrolytic phase.

Although a molecular sieve zeolite cell may be fully hydrated over the range of from room temperature to somewhat above about 100° C., above such temperature range the zeolite compacts in the cell become less and less hydrated as the operating temperature increases. The reduced cation mobility attendant herewith tends to decrease the ionic conduction. However, there is a counter-effect, namely, the decrease in cell resistance as the temperature rises. At the elevated temperatures the latter effect is dominant. The resistance of the zeolite for ionic conduction decreases exponentially with temperature.

Conventional solid-electrolyte batteries cannot withstand elevated temperatures (above about 150° C.), one reason being that the separator used therein fails at such temperatures. The zeolite cells of the invention, however, also perform satisfactorily at elevated temperatures up to at least 500° C.

The only limit to high temperature operation (other than the thermal stability of the anode and contact materials) is apparently the thermal stability of the zeolite. For most crystalline molecular sieve zeolites this limit is about 750° C. but in some cases extends to above 1000° C.

A number of crystalline zeolites, either synthetic or naturally-occurring, may be used as separators in the cells of this invention. Sodium zeolite A in which a substantial proportion of the sodium cations (about 75%) had been ion-exchanged for calcium cations has the highest conductivity of the zeolites measured thus far, and is therefore a preferred separator. Synthetic sodium zeolite A ($Na_2A$), sodium zeolite X ($Na_2X$) and ammonium-exchanged zeolite X [$(NH_4)_2X$] are also good separator materials, as are the naturally-occurring crystalline zeolites such as faujasite, chabazite, erionite and mordenite. Mixtures of crystalline zeolites may also be used.

Catholyte materials such as copper (CuII) exchanged sodium zeolite X ($Cu(II)X$), silver exchange sodium zeolite X ($Ag_2X$), mercury Hg(II) exchanged sodium zeolite X ($HgX$) and ammonium exchanged sodium zeolite X [$(NH_4)_2X$] are especially useful in these cells. A ½-inch diameter cell of the composition $Hg(II)X$-$Na_2X$-$Zn$ with an open current voltage of 0.8 volt has proved to be one of the most promising, delivering 0.62 microampere through a 1-megohm load (3.2 μamperes per square inch of cross sectional cell area), or at maximum power 3.4 microamperes at 0.34 volt (17 μamperes per square inch of cross sectional cell area).

While a copper exchanged zeolite catholyte with zinc anode, and a copper exchanged zeolite catholyte with magnesium anode, have been found to give superior results for a number of applications, it is to be understood that the catholyte may be any crystalline metal aluminosilicate containing a substantial number of cations of a metal which is electronegative toward the metal selected as the anode.

Any degree of ion exchange of the zeolite used as the catholyte material may be used; however, the lower the degree of such exchange the lower will be the reducible cation density and therefore the electro-chemical equivalent value of the composite cell. Zeolites having a substantial portion of their exchangeable cations replaced by one or more cations capable of reduction by common anode metals are therefore to be preferred for most applications. Mixed-cation exchanged zeolites may also be used.

A desirable feature of a battery catholyte is a high electrochemical equivalent value. This value is a measure of the total available power provided that the electrochemical reaction proceeds to completion. A monovalent metal cationic zeolite such as fully ion-exchanged silver zeolite X or silver zeolite A contains about 650 coulombs/cc. of electrochemical energy. This value is considerably higher than electrochemical equivalent values for organic ion-exchange resins, and is very close to the value of 850 coulombs/cc. found for a standard Le Clanche dry cell.

Some of the metals which may be employed as anodes are aluminum, antimony, copper, iron, lead, magnesium, nickel, zinc and their alloys such as the amalgams thereof. The contact through which the electrical lead is connected to the catholyte should be an electrical conductor which does not form a voltaic cell with the reducible cations of the catholyte. As catholyte-contact materials in the construction of these zeolite cells, iron, nickel, platinum, silver, gold and copper are satisfactory. Conducting carbon has also been employed.

It is essential that the zeolite material used in preparing the cell components be compressed sufficiently to provide good electrical contact between the particles. Too high a pressure, however, results in destruction of the zeolite, while too low a pressure results in weak compacts. For example, measurements were made on a group of cells of the $Au$-$Ag_2X$-$Na_2X$-$Zn$ type to determine the effect of the pressure of formation on cell performance. It was found that pressures of from 40,000 to about 80,000 p.s.i. may be used at 150 C. without deleterious effect on cell characteristics. Use of pressures beyond about 80,000 p.s.i. resulted in the formation of rather fragile compacts. When pressed under the preferred conditions in tungsten carbide dies, zeolite compacts are hard and coherent, and offer no serious handling problems.

It is to be understood that the terminology used in the specification to indicate cell composition is in the order of catholyte-contact, catholyte, separator and anode. Thus a $Au$-$Cu(II)X$-$Na_2X$-$Zn$ cell has a gold catholyte contact, a copper-exchanged zeolite X catholyte, a sodium zeolite X separator, and a zinc anode.

One method of preparation of zeolite cells according to the invention comprises placing a one-half inch diameter disc of metal foil suitable for use as the anode which has been carefully cleaned in the bottom of the die. The cell separator, consisting of sodium zeolite X, calcium zeolite A, or sodium zeolite A or one of the other separator zeolites disclosed previously in powder form (minus 200 mesh or finer) is placed over the metal in a thin layer. The cell catholyte is composed of a sodium zeolite X ion-exchanged with an easily reducible metal cation. Copper (II), silver (I) and mercury (II) zeolite A or X as minus 200 mesh powders are preferably employed. The powder is placed over the separator layer and covered with a thin gold or copper electrode. A pressure of from 50,000 to 70,000 p.s.i. is then applied and the die is evacuated. The furnace is then turned on and the temperature is allowed to rise to between about 100° C. and 200° C., at which time the pressure is released and the cell allowed to cool. Upon removal of the cell from the die, fine copper wires are soldered to the cell ends to act as leads. For actual use, the cell may at this point be hydrated to the desired degree. For normal testing at room temperature, the cells are held suspended in plastic capped glass vials by the lead wires. In the bottom of the vial is placed a few drops of saturated sodium chloride-water solution in order to maintain the relative humidity around the cells at about 75%.

The procedure outlined above is convenient for laboratory preparation of the instant cells, but of course this procedure could be modified as desired for production. It has been demonstrated that zeolites can be compacted to sufficient hardness and coherence with conventional pelletizing equipment.

Cells with aluminum anodes have been successfully prepared by pressing a small disc of zinc onto the back of the aluminum in current carrying relationship so that contact wires may be attached by soldering to said zinc.

Table I shows the reproducibility in open circuit voltage obtainable with the present fabrication techniques. The eight cells were prepared in succession and are not selected specimens.

TABLE I

| Cell composition | Thickness (inches) | Open circuit voltage |
|---|---|---|
| Au-Ag₂X-CaA-Zn | .1570 | 1.40 |
| Au-Ag₂X-CaA-Zn | .1542 | 1.40 |
| Au-Ag₂X-CaA-Zn | .1605 | 1.43 |
| Au-Ag₂X-CaA-Zn | .1578 | 1.36 |
| Au-Hg(II)X-CaA-Zn | .1628 | 1.25 |
| Au-Hg(II)X-CaA-Zn | .1655 | 1.23 |
| Au-Hg(II)X-CaA-Zn | .1690 | 1.17 |
| Au-Hg(II)X-CaA-Zn | .1673 | 1.18 |

The following examples illustrate the preparation of the solid-state devices of this invention.

*Example I*

A disc of sheet zinc was placed in the bottom of the ¼-inch diameter Carboloy die. A few milligrams of hydrated $Na_2X$ zeolite were placed over the zinc. About three grams of hydrated copper (II) exchanged zeolite X were carefully added over this. Finally a disc of gold foil was added to serve as the catholyte contact. The layered assembly was pressurized in vacuum to 60,000 p.s.i. Heat was then applied for about 20 minutes until the press thermocouple read 125° C. Heating was then discontinued. After cooling, the composite was removed from the die in the form of a hard, coherent pellet 0.205 inch thick.

*Example II*

A disc of waxed paper was placed in the bottom of the ½-inch die with a disc of sheet zinc on top. Sodium zeolite X powder (0.510 gram) was added over the zinc and pressed at 20,000 p.s.i. without heat. Next, 0.109 gram of a silver-exchanged sodium zeolite X was added on top of the sodium zeolite X disc, followed by a disc of gold foil. The composite was then pressed at 60,000 p.s.i. and heated to 150° C. under vacuum. When the temperature reached 150° C., heating was discontinued. After cooling, the composite pellet was removed from the die. This pellet measured 0.504 inch diameter and 0.097 inch thick.

*Example III*

The procedure of Example II above was used, except that (1) a mercury-exchanged zeolite X was used in place of silver-exchanged X, and (2) the zinc electrode disc has been lightly amalgamated with a $Hg(C_2H_3O_2)_2$ solution. Using various weighed amounts of $Na_2X$ and $Hg(II)X$ powders respectively as separator and catholyte material, six pellets were obtained. These composites were all around 0.505 inch diameter and ranged from 0.092 to 0.176 inch in thickness.

*Example IV*

The procedure of Example III above was used, except that (1) calcium-exchanged zeolite A was used in place of $Na_2X$, (2) aluminum was used in place of zinc, and (3) a disc of sheet zinc was pressed to the Al electrode to provide a soldering surface. A hard, coherent pellet measuring 0.505 inch diameter and 0.172 inch thickness was produced.

The performance characteristics of a number of zeolite cells according to the invention will now be described.

Since the current drain of zeolite cells causes a voltage change, the conventional potentiometer method of measuring voltages is unsatisfactory. In order to measure true open circuit voltages a very high impedance vacuum tube voltmeter is employed. A satisfactory instrument is the General Radio Model 1230-a D.C. amplifier and electrometer. This instrument has input impedances from 0 to $10^{14}$ ohms and a voltage range of 30 mv. to 10 volts. A panel and switching arrangement was constructed so that the performance characteristics of as many as 24 different cells could be tested under different load conditions. A General Electric Recording Milliammeter calibrated to read in volts was attached to the circuit to allow continuous measurement of cell performance. All tests were carried out at a relative humidity of 75%.

Open circuit voltage is quite reproducible from cell to cell depending on composition. However, techniques for soldering lead wires to the catholyte-contact and anode must be used which will not cause damage such as causing an insulating partial layer of decomposed zeolite or a partial crack through the cell.

Table II below presents performance data on three types of cells at room temperature. In all cases when a cell was discharged through a load the voltage dropped rapidly for several minutes and then stayed essentially constant for the 24-hour duration of the test. Performance of the $Au-Hg(II)X-Na_2X-Zn$ cell is particularly outstanding in that an appreciable current could be drawn with only a 23% drop in voltage as the load was applied.

TABLE II

| Cell composition | Open-circuit voltage | Load, ohms | Current, μamp. | Voltage under load |
|---|---|---|---|---|
| $Au-Ag_2X-Na_2X-Zn$ | 0.70 | $10^6$ | 0.22 | 0.22 |
| $Au-Cu(II)X-Na_2X-Zn$ | 0.42 | $10^6$ | 0.10 | 0.10 |
| $Au-Hg(II)X-Na_2X-Zn$ | 0.80 | $10^6$ | 0.62 | 0.62 |
| $Au-Hg(II)X-Na_2X-Zn$ | 0.80 | $10^5$ | 3.4 | 0.34 |
| $Au-Hg(II)X-Na_2X-Zn$ | 0.80 | $10^4$ | 6.0 | 0.06 |

An additional manner of altering the characteristics of a cell of a given composition is by occluding salts within either the catholyte or separator zeolitic materials.

One example of such a modification involved fusing silver nitrate and mixing a quantity of activated zeolite into the fused silver nitrate. The mass was allowed to solidify and then was pulverized in water followed by filtration and washing. The final products contained about 1 wt.-percent $NO_3=$. The fused salt method of introduction of the occluded salt is preferred when the cation of the salt to be occluded would tend to exchange with the cation of the zeolite. When the cation is the same the salt occlusion can be done by any method such as deposition from a fairly concentrated aqueous solution. The washing of the salt containing zeolite as a final step is desirable only to remove the surface-adsorbed salt leaving only the more strongly adsorbed material. The cells were then made in the manner set forth above with the zeolite containing the occluded salt used in eiter or both the catholyte and separator.

Data given in Table III further illustrates the performance of various types of zeolite cells at room temperature. The data presented in this table gives an indication of the performance of different types of cells under differing load conditions.

TABLE III

| Cell composition | Load, ohms | Voltage at start | Voltage at end | Time (in days) |
|---|---|---|---|---|
| $Au, Ag_2X, CaX, Zn$ | $10^6$ | 1.02 | | 53 |
| $C, Hg(II)X, CaA, Zn$ | $10^6$ | 1.05 | .28 | 77 |
| $Au, (AgNO_3-Ag_2X), Na_2X, Zn$ | $10^6$ | .52 | | 20 |
| $Au, (AgNO_3-Ag_2X), (NaNO_3-Na_2X), Zn$ | $10^6$ | .48 | | 46 |
| $Au, (Na_2X-AgNO_3), Na_2X, Zn$ | $10^6$ | .50 | | 63 |
| $Au, Hg(II)X, CaA, Zn$ | $10^5$ | .70 | .05 | 52 |
| $Au, Ag_2X, CaA, Zn$ | $10^6$ | 1.35 | .27 | 52 |
| $Au, Hg(II)X, CaA, Zn$ | $10^6$ | 1.20 | .38 | 52 |

The graphs of FIGS. 2–5 also show the performance of various zeolite cells according to the invention. It may be readily seen that the magnitude of voltage available and the life of the cell are greatly increased by using small loads (high impedance). In order to increase both voltage and current available to a given load it is obvious that the cells can be multiplied in series and parallel connections to increase said voltage and current respectively.

FIG. 6 shows some performance data on cells containing occluded salts. Although the initial working voltage is considerably lower than for comparable cells without occluded salts, the data suggest that the voltage drop is more gradual for the occluded salt cells. This is in accord with the hypothesis that the addition of occluded salts impedes the migration of zeolitic cations and thus raises the activation energy for a conduction. The addition of extra cations, however, provide an increased number of current carrying species and thus decrease the tendency to polarize. A wide variety of occluded salt cells may be made, and this technique is useful for enhancing the performance of zeolite primary cells.

The ionic conductivity of zeolites behaves in typical fashion in that it increases exponentially with temperature.

To illustrate the high temperature capabilities of cells of the present invention, an $Au.Cu(II)X.Na_2X.Zn$ cell was dehydrated and then heated in air while delivering current. The exponential increase in current with increase in temperature is shown by the data in Table IV below.

TABLE IV

| Temperature °C. | Output current, amp. in air |
|---|---|
| 260 | $3 \times 10^{-7}$ |
| 350 | $2 \times 10^{-6}$ |
| 400 | $7 \times 10^{-6}$ |
| 500 | $2.8 \times 10^{-5}$ |
| 580 | a $3 \times 10^{-6}$ | a Beyond 500° C. zinc electrode had melted.

Since most zeolites are thermally stable, at least to 750° C., zeolite cells are operable at unusually high temperatures. For room temperature operation, the zeolite cells are partially hydrated because the addition of water also greatly enhances the zeolite conductivity. It is apparent that the best performance at elevated temperatures would be obtained from a cell which was hydrated and sealed so that the beneficial effects of both zeolitic water and higher temperature could be realized.

Normally, for high temperature testing, the cell is exposed to the atmosphere and the zeolitic water allowed to escape as the temperature rises. This causes a drop in voltage between roughly 100–200° C. because the beneficial effect of higher temperature has not at that point exceeded the detrimental effect due to the decrease of ionic conductivity which is in turn due to loss of water. At higher temperatures, however, the voltage returns close to the normal value, but it is temperature dependent. The temperature dependence of voltage and the increase power output capabilities are features that can be correlated to the conditions of use.

Table V shows measurements of voltage vs. temperature. The mercury (II) and silver (I) X zeolites have shown a tendency towards thermal reduction and are thus less useful for high temperature cells. Cu(II) X zeolite, however, although it exhibits a much lower voltage, is thermally stable to very high temperatures. Thus, the major limitation on high temperature performance of Cu(II) X zeolite cells is in the thermal stability of the other materials. Cells having zinc anodes of course will not operate much higher than 400° C. because of its low melting point. Cells with aluminum anodes should be operable up to 650° C., however. The cell with the magnesium electrode showed the best results insofar as maintaining voltage is concerned since after 12 days under a load of $10^6$ ohms, the voltage was still 1.8 volts. Cells containing the mercury exchanged zeolite probably won't be suitable at elevated temperatures since mercury showed a tendency to vaporize. Silver exchanged zeolite X with zinc or magnesium electrodes has given the best over all high temperature operation.

TABLE V

| Cell composition | Voltage | Temperature, °C. | Time |
|---|---|---|---|
| Au-Cu(II)X-Na₂X-Zn | .10 | 350 | 1 hour. |
| Au-Ag₂X-CaA-Zn | .37 | 350 | 3 days. |
| Au-Hg(II)X-CaA-Zn | .16 | 300 | 1 hour, above 300° C. Hg starts to vaporize. |
| Au-Ag₂X-CaA-Zn | .34 | 350 | 22 days. |
| Au-Ag₂X-CaA-Mg | 1.8 | 350 | 12 days. |

An additional series of Au-Ag₂X-CaA-Mg cells with magnesium metal electrodes were prepared and the characteristics were measured with a load of $10^{11}$ ohms (open circuit) at 350° C. The open circuit voltages of these cells were the highest that have been obtained from single zeolite cells. Open circuit voltages on four different cells are listed in Table VI.

TABLE VI

| Example: | Voltage, open circuit |
|---|---|
| 1 | 2.0 |
| 2 | 2.05 |
| 3 | 2.1 |
| 4 | 1.95 |

In a low temperature test of a solid state battery according to the invention an Au.Hg(II)X.CaA.Zn cell was packed in powdered Dry Ice. The initial open circuit voltage was 1.1 volts and the open circuit voltage at about −78° C. was slightly greater than one volt.

Imperforate layers or metal foils are preferred for the catholyte-contact and anode elements to provide a maximum current carrying area and minimum cell internal resistance, however, a perforate layer such as metal gauze or mesh could be used as well as other electrical conductors such as powder metal compacts, metal-ceramics, and the like.

The above data and description clearly show the unique properties of the solid state batteries of the present invention. As may be seen from the examples a wide variety of zeolites may be used as catholyte and separator materials. Both natural and synthetic crystalline zeolitic molecular sieves may be used in practicing the invention. The following references disclose methods of making both the zeolites for use in the separators and the ion-exchanged zeolites for use in the catholytes:

Zeolite A is described and claimed in U.S. patent application Serial No. 400,388, filed December 24, 1953, now U.S. Patent 2,882,243.

Zeolite X is described and claimed in U.S. patent application Serial No. 400,389, filed December 24, 1953, now U.S. Patent 2,882,244.

For both the zeolite A and the zeolite X the sodium form is the easiest to make. However, other metal cations may be readily substituted for the sodium cations in the above zeolites by conventional ion-exchange techniques.

In summary, the principal advantage of the zeolite cells of the invention are compactness, simplicity, lightness of weight and the ability to operate over wide temperature ranges. A zeolite primary cell is truly a solid state cell and even though the zeolite may be in the hydrated form, the water is not a continuous liquid phase. Experiments have confirmed that zeolite primary cells can be made with useful operating voltages and from which measureable useful currents can be drawn.

Zeolite primary cells have been made which have open circuit voltages as high as 2.1 volts and are capable of delivering current in the microampere range. These cells will operate from −78° C. to above 500° C.

While certain cell compositions have been shown for the purpose of illustrating the invention, it is to be understood that many modifications and combinatons could be made by a person skilled in the art without departing from the spirit and scope of the invention.

What is claimed is:

1. A solid state battery comprising a low resistance contact element, a catholyte material in intimate contact with said contact element, a metal anode element and an ion conducting separator interposed between the catholyte material and the anode element, and wherein the catholyte comprises a crystalline zeolitic material containing metal cations therein the metal of said metal cations being electronegative with respect to the metal of the anode, and wherein the separator comprises a crystalline zeolitic material.

2. A solid state battery as set forth in claim 1 wherein at least one of the crystalline zeolitic materials used for the catholyte and the separator contain silver nitrate occluded therein.

3. A solid state battery having excellent high temperature and low temperature operating characteristics which comprises a multiple layer body wherein the layers are mechanically bonded together and wherein the first layer is a suitable anode metal, the second layer is a crystalline zeolitic separator, the third layer is a crystalline zeolitic material having therein cations of a metal electronegative with respect to the anode metal and which layer serves as a catholyte, and a final layer of an electro conductive material and wherein electrical conductors are affixed to the anode layer and the layer of conductive material.

4. A solid state battery comprising respectively an anode, a separator, a catholyte, and a catholyte contact in adjacent layers wherein the anode comprises a layer of metal, the separator is composed of an ion conducting crystalline zeolitic material, the catholyte is composed of a crystalline zeolitic material containing metal cations therein, the metal whose cations are contained in the catholyte being electronegative with respect to the metal of the anode, and wherein the catholyte contact is composed of any suitable electro conductive material.

5. A solid state battery as set forth in claim 4 wherein the anode comprises zinc foil, the separator is sodium zeolite X ($Na_2X$) the catholyte is a copper exchanged zeolite X ($Cu(II)X$), and the catholyte contact is gold foil.

6. A solid state battery as set forth in claim 4 wherein the anode is zinc, the separator is sodium zeolite X ($NA_2X$), the catholyte is silver exchanged zeolite X ($Ag_2X$), and the catholyte contact is gold foil.

7. A solid state battery as set forth in claim 6 wherein the catholyte also has a small amount of silver nitrate ($AgNO_3$) occluded therein.

8. A solid state battery as set forth in claim 6 wherein the catholyte has a small amount of silver nitrate ($AgNO_3$) occluded therein, and the separator has a small amount of sodium nitrate ($NaNO_3$) occluded therein.

9. A solid state battery as set forth in claim 4 wherein the anode is zinc, the separator is sodium zeolite X ($Na_2X$), the catholyte is mercury exchanged zeolite X ($Hg(II)X$), and the catholyte contact is gold foil.

10. A solid state battery as set forth in claim 4 wherein the anode is zinc, the separator is calcium zeolite A (CaA), the catholyte is silver exchanged zeolite X ($Ag_2X$), and the catholyte contact is gold foil.

11. A solid state battery as set forth in claim 4 wherein the anode is zinc, the separator is calcium zeolite A (CaA), the catholyte is mercury exchanged zeolite X ($Hg(II)X$) and the catholyte contact is gold foil.

12. A solid state battery as set forth in claim 4 wherein the anode is zinc, the separator is calcium zeolite X (CaX), the catholyte is silver exchanged zeolite X ($Ag_2X$) and the catholyte contact is gold foil.

13. A solid state battery as set forth in claim 4 wherein the anode is magnesium, the separator is calcium zeolite A (CaA), the catholyte is silver exchanged zeolite A ($Ag_2X$), and the catholyte contact is gold foil.

14. A solid state battery as set forth in claim 4 wherein the anode is aluminum, the separator is calcium zeolite A (CaA), the catholyte is mercury exchanged zeolite X ($Hg(II)X$) and the catholyte contact is gold foil.

15. A solid state battery as set forth in claim 5 wherein the anode is zinc, the separator is sodium zeolite X ($Na_2X$), the catholyte is sodium zeolite X with a small amount of silver nitrate occluded therein, and the catholyte contact is gold foil.

16. A solid state battery as set forth in claim 4 wherein the crystalline zeolitic materials utilized in the catholyte and separator have occluded therein a salt having the same anion as the anion of said catholyte.

17. A method of making a solid state battery which comprises placing a layer of anode material in the bottom of a cup die, depositing a layer of powdered separator material over the anode material, depositing a layer of powdered catholyte material over the separator material, such powdered separator material and powdered catholyte material being a thermally stable crystalline zeolite material, placing a thin conductive metal foil over the catholyte material, and compressing the layers with a piston while concurrently heating the same to a temperature of between about 100 and 200° C.

18. A method as set forth in claim 17 which includes precompacting each successive layer as it is placed in the cup die.

References Cited by the Examiner

UNITED STATES PATENTS

| Re. 24,222 | 9/56 | Patnode et al. | 204—296 X |
|---|---|---|---|
| 1,416,195 | 5/22 | Hacking | 136—144.4 |
| 2,206,289 | 7/40 | McDaniel | 136—144.4 |
| 2,718,539 | 9/55 | Bradshaw et al. | 136—153 |
| 2,861,116 | 11/58 | Grubb | 136—153 |
| 2,933,547 | 4/60 | Grubb | 136—153 X |

FOREIGN PATENTS 16,684/13  5/14  Great Britain.

OTHER REFERENCES

"Storage Batteries," Vinal, 4th Edition, 1955, pages 134, 144, and 145.

JOHN H. MACK, *Primary Examiner.*

JOHN R. SPECK, *Examiner.*